US009275622B2

(12) United States Patent
Claeys et al.

(10) Patent No.: US 9,275,622 B2
(45) Date of Patent: Mar. 1, 2016

(54) VIBRO-ACOUSTIC ATTENUATION OR REDUCED ENERGY TRANSMISSION

(75) Inventors: Claus Claeys, Kessel-Lo (BE); Bert Pluymers, Rummen (BE); Wim Desmet, Sint-Joris-Weert (BE)

(73) Assignee: KATHOLIEKE UNIVERSITEIT LEUVEN, Leuven (BE)

( * ) Notice: Subject to any disclaimer, the term of this patent is extended or adjusted under 35 U.S.C. 154(b) by 0 days.

(21) Appl. No.: 14/008,123

(22) PCT Filed: Mar. 29, 2012

(86) PCT No.: PCT/EP2012/055742
§ 371 (c)(1),
(2), (4) Date: Oct. 8, 2013

(87) PCT Pub. No.: WO2012/131011
PCT Pub. Date: Oct. 4, 2012

(65) Prior Publication Data
US 2014/0027199 A1      Jan. 30, 2014

(30) Foreign Application Priority Data

Mar. 29, 2011   (GB) .................................. 1105244.6
Mar. 29, 2011   (GB) .................................. 1105260.2
Jun. 16, 2011   (GB) .................................. 1110185.4

(51) Int. Cl.
| | |
|---|---|
| *F16F 7/104* | (2006.01) |
| *F16F 15/04* | (2006.01) |
| *G10K 11/00* | (2006.01) |
| *G10K 11/172* | (2006.01) |
| *F16F 7/10* | (2006.01) |
| *F16F 15/00* | (2006.01) |

(52) U.S. Cl.
CPC ............ *G10K 11/002* (2013.01); *G10K 11/172* (2013.01)

(58) Field of Classification Search
USPC .......................................... 181/292, 288, 207
See application file for complete search history.

(56) References Cited

U.S. PATENT DOCUMENTS

| | | | | | |
|---|---|---|---|---|---|
| 2,185,023 | A | * | 12/1939 | Crane ............................. | 138/30 |
| 2,541,159 | A | * | 2/1951 | Geiger ........................... | 181/208 |
| 2,796,636 | A | * | 6/1957 | Heerwagen .................... | 52/144 |
| 3,952,831 | A | * | 4/1976 | Bernard et al. ................ | 181/292 |
| 4,149,612 | A | * | 4/1979 | Bschorr ......................... | 181/286 |

(Continued)

FOREIGN PATENT DOCUMENTS

| | | |
|---|---|---|
| GB | 827042 | 2/1960 |
| JP | 2006337886 A | 12/2006 |

OTHER PUBLICATIONS

Martinsson, P.G., et al., "Vibrations of Lattice Structures and Phononic Band Gaps", Quarterly of Mechanics and Applied Mathematics, pp. 45-64, Oxford University Press, 2003.

(Continued)

*Primary Examiner* — Edgardo San Martin
(74) *Attorney, Agent, or Firm* — Workman Nydegger

(57) ABSTRACT

Vibro-acoustic attenuation or reduced energy transmission. The present invention relates to devices that display frequency zones of strong vibro-acoustic attenuation or reduced energy transmission. This can be used in particular, although not necessarily solely, in applications that require lightweight materials with good mechanical properties and good vibro-acoustic response or in applications that require materials with high sound reflection, absorption or sound isolation in a certain frequency band.

20 Claims, 8 Drawing Sheets

(56) References Cited

U.S. PATENT DOCUMENTS

| | | | | |
|---|---|---|---|---|
| 4,177,876 | A | * | 12/1979 | Pujolle ............... 181/284 |
| 4,371,858 | A | * | 2/1983 | Kanoi et al. ............ 336/100 |
| 5,521,341 | A | * | 5/1996 | Stief et al. ............ 181/295 |
| 5,587,564 | A | * | 12/1996 | Stief et al. ............ 181/295 |
| 5,997,985 | A | * | 12/1999 | Clarke et al. ............ 428/116 |
| 6,433,931 | B1 | * | 8/2002 | Fink et al. ............ 359/586 |
| 6,478,110 | B1 | * | 11/2002 | Eatwell et al. ............ 181/207 |
| 6,536,556 | B2 | * | 3/2003 | Porte et al. ............ 181/292 |
| 6,576,333 | B2 | | 6/2003 | Sheng et al. |
| 6,739,425 | B1 | * | 5/2004 | Griffin et al. ............ 181/171 |
| 7,249,653 | B2 | * | 7/2007 | Sheng et al. ............ 181/290 |
| 7,267,196 | B2 | * | 9/2007 | Mathur ............ 181/208 |
| 7,395,898 | B2 | * | 7/2008 | Yang et al. ............ 181/286 |
| 7,553,533 | B2 | * | 6/2009 | Manfredotti ............ 428/134 |
| 7,854,298 | B2 | | 12/2010 | Ayle |
| 8,047,329 | B1 | * | 11/2011 | Douglas et al. ............ 181/292 |
| 8,282,085 | B2 | * | 10/2012 | Manfredotti ............ 267/136 |
| 8,607,924 | B2 | * | 12/2013 | Ichihashi ............ 181/292 |
| 8,616,330 | B1 | * | 12/2013 | McKnight et al. ............ 181/207 |
| 8,752,667 | B2 | * | 6/2014 | McKnight et al. ............ 181/287 |
| 8,833,510 | B2 | * | 9/2014 | Koh et al. ............ 181/207 |
| 2004/0154418 | A1 | | 8/2004 | Pompei |
| 2005/0189165 | A1 | | 9/2005 | Mathur |
| 2005/0194210 | A1 | * | 9/2005 | Panossian ............ 181/293 |
| 2007/0014418 | A1 | | 1/2007 | Eatwell et al. |
| 2009/0223738 | A1 | | 9/2009 | Nakamura et al. |
| 2011/0240402 | A1 | * | 10/2011 | Chou et al. ............ 181/207 |

OTHER PUBLICATIONS

Yang, Z, et al., "Acoustic Metamaterial Panels for Sound Attenuation in the 50/1000 Hz Regime", Applied Physics Letters 96, 041906, 2010.

Liu, X.N., et al., "Wave Propagation Characterization and Design of Two-Dimensional Elastic Chiral Metacomposite", Journal of Sound and Vibration 330, pp. 2536-2553, 2011.

International Search Report from corresponding PCT Application Serial No. PCT/EP2012/055742, Sep. 14, 2012.

* cited by examiner

A

B

C

VIBRO-ACOUSTIC ATTENUATION OR REDUCED ENERGY TRANSMISSION

FIELD OF THE INVENTION

The present invention relates to the field of vibro-acoustic attenuation and/or reduced energy transmission. More particularly the present invention relates to methods for vibro-acoustic attenuation or reduced energy transmission and to devices with cavities that display frequency zones of strong vibro-acoustic attenuation or reduced energy transmission. This can be used in particular, although not necessarily solely, in applications that require lightweight materials with good mechanical properties and good vibro-acoustic response or in applications that require materials with high sound reflection, absorption or sound isolation in a certain frequency band.

BACKGROUND OF THE INVENTION

Materials with cavities, such as e.g. honeycomb core panels, can combine excellent mechanical properties with a low mass, making them attractive for application in transport and machine design. However, the high stiffness to mass ratio of these lightweight panels may result in unsatisfactory dynamic behaviour in that it may impair the panels' ability to reduce noise and vibration levels.

A variety of methods exists to insulate against sound transmission. These methods rely often on the acoustic mass law or the addition of an absorptive layer. The first method results in heavy materials, where the second method leads to thick materials, since to be efficient, the thickness of the absorptive layer should be in the same order of magnitude as the acoustic wavelength, making this last method only effective for high-frequency attenuation.

Another approach uses acoustic resonators based on the Helmholtz resonance principle. This phenomenon exists when an air cavity is connected to the atmosphere (air surrounding the structure) through a smaller connection (called the neck). The mass of the air in the neck can resonate on the stiffness of the air cavity, causing dissipation of energy in a specific frequency region. Although allowing very effective sound attenuation in certain frequency regions, these materials are very sensitive for contamination, since the characteristics of the connections between cavity and surrounding environment are crucial and may not be contaminated.

The degradation of performance due to contamination is the main weakness of methods as described in U.S. Pat. No. 7,854,298 B2 or JP2006337886 which are based on both Helmholtz resonances and acoustic impedance of material, which are both very sensitive for contamination.

To reduce structural vibrations most often tuned vibration absorbers are used. The addition of a local structural resonator can, in certain frequencies, trap the most of the movement of the material in a localized mode. The localization of movement is the main principle behind these tuned vibration absorbers. This local resonator is an addition to the structure at a certain point and prevents the movement of the structure at that point at a certain frequency.

This tuned vibration absorbers is a method for local vibration suppression while for acoustic radiation reduction, global vibration reduction is necessary. By using multiple tuned vibration absorbers, one can try to expand the local method to a global method to reduce both vibration and acoustic radiation.

In U.S. Pat. No. 6,576,333 B2 a method is described for creating sound isolation which comprises the inclusion of rigid high density particles in an inclusion of soft material to act as localized resonators. This method however has the disadvantages of changing the mechanical properties of the structure, the addition of considerable weight to the structure and being difficult to manufacture.

In Patent Application Publication No. 2004/0154418 A1 a similar method is used in which instead of an inclusion of coated spheres, addition of a flexible and heavy polymer is used. This solution poses the same problems concerning weight and producability.

In Applied Physics Letters 2010 (96) 041906, Yang et al. propose resonating membranes with high mass inclusions. Here the low acoustic transmission is not found at the resonance frequency of the local resonator but in between two resonance modes of the membrane. This because rather relying on localizing movement as in tuned vibrators, this method relies on the existence of localized modes which have imaginary acoustic wavelengths and are thus not able to radiate acoustically.

In Journal of Sound and Vibration 2011 (330) 2536-2553, Liu et al. propose a method for structural attenuation by the deformation of internal inclusion of high mass spheres with rubber coating in a lattice. The main weakness of this method is that it is only effective for in-plane motion and thus not effective for tackling the common noise and vibration problems. Furthermore the resonance of these structures relies again on a combination of materials which is difficult to produce. The tuning of the attenuated frequencies will have a huge impact on the stiffness of the overall structure and the addition of high density spheres lead to a high increase of mass.

Locally resonant structures can have an impact in the field of focusing and confining light with acoustic meta materials and the technique can be used for blocking in-plane waves, as described by Martinsson et al. in Quarterly of Mechanics and Applied Mathematic 2003 (56) 45-64.

SUMMARY OF THE INVENTION

It is an object of embodiments of the present invention to provide good methods and devices for any of vibration and/or sound insulation, of sound absorption or of reduction of sound or energy transmission in at least one frequency range, as well as to provide good methods for manufacturing such devices.

It is an advantage of embodiments of the present invention that systems and methods are provided wherein the addition of structures with a structural resonance are used for acting as local resonators to create frequency zones with reduce energy transmission leading to both reduced structural vibration and reduced sound radiation.

The above objective is accomplished by a method and device according to the present invention.

The present invention relates to a device for vibro-acoustic attenuation and/or for reduced energy transmission, the device comprising a host structure, sometimes also referred to as the material or the structure or the original structure, and comprising at least one mechanical resonator, sometimes also referred to as a resonating structure, connected to the host structure, the at least one mechanical resonator being connected to one or more sides of the host structure by one or more connection legs, wherein the at least one connected resonator has a vibration mode predominantly excitable by out of plane movement of the host structure.

The host structure can be a mechanical structure, a homogeneous material or a material made up of a combination of materials. The frequency of the vibration mode of the at least one mechanical resonator may be selected to correspond with the frequency range where good vibrational attenuation, increased acoustic absorption or reduced acoustic transmission of the host structure is required. The at least one mechanical resonator may be made as a homogeneous resonator, made from the same material as the host structure. Alternatively these may be made of a different material. The device can be made as a homogeneous structure from one material or from a combination of materials.

The mechanical resonators may be made of a material with selected density and Young's modulus and have a selected geometry and wherein the one or more connection legs for connecting having a selected geometry and are selected in number so that the frequency of the vibration mode is tuned to be predominantly excitable by out of plane movement.

The mechanical resonator may have a vibration mode in the frequency zone wherein vibro-acoustic attenuation is desired. The first mode of the resonating structure, predominantly excited by out-of-plate-movement of the host structure, will be linked to the structure as a whole resonating on the stiffness of the connection points to the host structure. The frequency of this vibration mode can be lowered by decreasing the stiffness of the connection, and increasing the mass of the centre of the resonator. This can be done by using different materials, changing the shape of the structure or changing the number of connections.

The at least one resonator may be connected to the host structure by at least two connection legs.

The host structure may comprise a plurality of cavities and wherein the at least one mechanical resonator is connected therein.

The at least one resonator may be connected to at least two sides of the cavities of the structure.

The plurality of cavities may be a plurality of closed cavities.

More than one cavity may comprise a mechanical resonator. Alternatively or in addition thereto, at least one cavity may comprise more than one mechanical resonator. The more than one mechanical resonator may be advantageous for obtaining a frequency range or for increasing the frequency range of vibrational attenuation acoustic absorption or reduced transmission. The more than one mechanical resonator may also be advantageous for increasing the vibrational attenuation, acoustic absorption or reduce the acoustic transmission. The more than one mechanical resonators may have a same vibration mode for obtaining strong vibro-acoustic attenuation. At least some of the more than one mechanical resonators may comprise a different vibration mode for obtaining multiple zones of vibro-acoustic attenuation.

The host structure may comprise a core that is made up of rectangular, cylindrical, elliptical, circular or polygonal unit cells or a combination of these unit cells.

The host structure may be periodic.

The host structure may be non-periodic.

The host structure may be a honeycomb structure.

The honeycomb structure may comprise a unit cell having a plurality of side panels and the at least one mechanical resonator may be connected to some or all of the side panels.

The honeycomb structure may comprise a hexagonal unit cell and wherein the resonator comprises three legs connected to three different side panels of the unit cell.

The honeycomb structure may comprise a hexognal unit cell and the at least one resonator may comprise six legs connected to the different side panels of the unit cell.

The device may be made of any of a composite material, a multilayered core material, a one layered core material, a combination of different kinds of core material or a homogeneous material or wherein the device comprises any of one covering layer or two covering layers made of the same material or two covering layers made of different materials.

The mechanical resonators may be made of homogeneous material, may be made of a homogeneous material being the same material as the host material or a core thereof, or may be made of multiple materials.

At least one of the mechanical resonators may comprise multiple mechanical resonance frequencies which are predominantly excited by out-of-plane motion of the host structure. It is advantageous that in multiple frequency ranges vibrational attenuation, acoustic absorption or reduced acoustic transmission can be achieved.

Alternatively, the mechanical resonator may comprise only one mechanical resonance frequency.

The at least one mechanical resonator may be a plurality of resonators.

At least some of the plurality of resonators may have a same vibration mode. This may assist in obtaining a stronger vibrational attenuation, acoustic absorption or reduction in acoustic transmission.

The distance between two resonators and the number of resonators may be selected such that the distance is on average smaller than or in the order of magnitude of half the wavelength of a free wave propagation in the host structure at the frequency zone wherein vibro-acoustic attenuation is desired. The latter may for example be performed for resonators having approximately the same frequency for the vibration mode.

The distance between two resonators and the number of resonators may be selected such that the distance is on average smaller than or in the order of magnitude of half the length of the spatial periodicity of the vibration pattern in the host structure without the at least one resonating structure in the frequency range wherein vibro-acoustic attenuation is desired.

At least some of the plurality of resonators have a different vibration mode. This may assist in achieving vibrational attenuation, acoustic absorption or reduced acoustic transmission in multiple frequency ranges.

The at least one mechanical resonator may have a non-symmetric mode in the zone where the vibro-acoustic attenuation is desired.

The device may be adapted for controlling semi-actively, actively or adaptively a resonance frequency of at least one mechanical resonator of the device.

At least one mechanical resonator of the device may comprise at least one connection leg with an internal channel in which pressure can be regulated, for actively controlling a resonance frequency.

The host structure may comprise a plurality of cavities stacked in three directions of the host structure. It is an advantage of embodiments of the present invention that mechanical resonators with the same vibrational modes or different vibrational modes can be chosen in the different cavities, which may be represented as different "layers", to either increase the effect of the structures or broaden the frequency range in which the additions have an effect.

In one aspect, the present invention also relates to a device comprising a host structure, sometimes also referred to as the material or the structure or the original structure, and comprising at least one mechanical resonator, sometimes also referred to as a resonating structure, connected to the host structure, wherein the device is adapted for adaptively altering a vibration mode of the resonator. In one embodiment the resonator may be a membrane that splits a cavity in two separate cavities forming resonating elements from the resonator and wherein the system comprises a pressure means, e.g. on one side of the cavity, for actively regulating the pressure thereby actively regulating the resonance of the resonating structure. The device also may comprise features and advantages of embodiments of the present invention described above.

The present invention also relates to a method of vibration and/or sound insulation, of sound absorption or of reduction of sound or energy transmission in at least one frequency range, the method comprising providing a device as described above.

The present invention furthermore relates to a method for manufacturing a device for vibro-acoustic attenuation and/or for reduced energy transmission, the method comprising providing a host structure and connecting at least one mechanical resonator having a vibration mode predominantly excitable by out of plane movement of the host structure to the host structure, wherein said connecting comprises providing one or more connection legs connecting the at least one mechanical resonator at one or more sides of the host structure with the host structure.

Said providing and connecting may comprise connecting resonators to closed cavities and thereafter adding said closed cavities to said host structure in a random or periodic manner.

Said providing and connecting may comprise 3-dimensional printing of the resonators connected to the closed cavities and thereafter adding said closed cavities to said host structure in a random or periodic manner.

The method may comprise making a layer of material comprising the mechanical resonators and connecting the layer between two layers of core material in such a manner that cavities comprising resonators result.

The one layer of material may comprise the mechanical resonators being interconnected by interconnection structures and the two layers of core material may be honeycomb structures.

The method may comprise 3 dimensional printing of the host structure and the at least one mechanical resonator.

The method may comprise tuning a material of at least part of the at least one resonator for increasing the damping in the resonator.

The method may comprise adding a damping layer to at least part of the at least one resonator for increasing the amount of damping in the resonator.

The present invention also relates to the use of a device as described above for any of vibration and/or sound insulation, of sound absorption or of reduction of sound or energy transmission in at least one frequency range.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
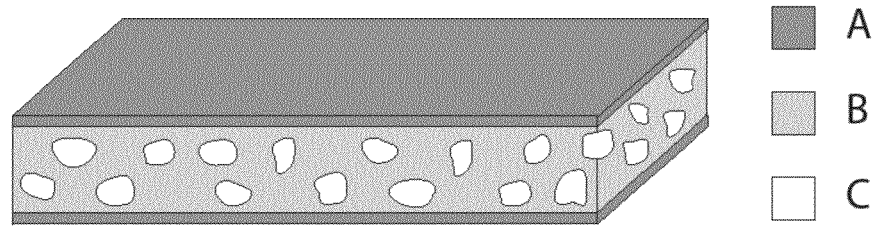
FIG. 1 shows a composite material with random distributed cavities of different size and shapes, which can be used as a basis material for manufacturing a device according to an embodiment of the present invention.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in embodiments of the present invention reference is mad to "local resonator", reference is made to a structure with one or more resonance frequencies that can be added internally into a cavity of the structure.

Where in embodiments of the present invention reference is made to a "composite material", reference is made to a material made from two or more constituent materials with significantly different physical or geometrical properties which remain separate and distinct at the macroscopic or microscopic scale within the finished structure.

Where in embodiments of the present invention reference is made to a "periodic material", reference is made to a material which can be made up by the repetition of a certain unit cell in one or more directions.

Where in embodiments of the present invention reference is made to a "unit cell", reference is made to part of a (composite) material which comprises all information so that the entire material can be built by a repetition of this cell.

Where in embodiments of the present invention reference is made to a "non-periodic structure", reference is made to a non homogenous structure, where there is no clear unit cell, e.g. material with cavities where the size and or distance between the cavities is randomly distributed.

Where in embodiments of the present invention reference is made to a "non-symmetric mode" reference is made to a mode shape of the local resonator with the property that the net sum of all forces in the contact points between local resonator and surrounding material is zero. Hence there is no resulting net force on the surrounding material.

Where in embodiments of the present invention reference is made to a mode that is "predominantly" excitable, reference is made to the fact that the mode that is predominantly excited is excited with a larger intensity than other modes.

Where in embodiments of the present invention reference is made to a "zone of attenuation", reference is made to a frequency band showing a low vibro-acoustic response.

The present invention relates to a device for vibro-acoustic attenuation and/or for reduced energy transmission. Embodiments of the present invention can advantageously be used for acoustic or vibrational isolation, although not being limited thereby. The device comprises a host structure and at least one mechanical resonator being connected to the host structure. According to embodiments of the present invention, the at least one mechanical resonator is being connected to one or more sides of the host structure by one or more connection legs. With connection legs, reference is made to the part of the resonator structure that is used to form a connection between the host structure and the resonator structure. Each separate, i.e. not continuous, connection with the host structure, can define a separate connection leg. Further according to embodiments of the present invention, the at least one connected resonator has a vibration mode predominantly excitable by out of plane movement of the host structure. Embodiments of this invention relate to devices which can show strong vibro-acoustic attenuation in certain chosen frequency ranges. The device may be used to obtain lightweight devices, e.g. materials, with good vibro-acoustic properties, or as a device for vibration isolation, reducing energy transmission, sound isolation or sound absorption.

Embodiments according to the present invention may for example be used for vibro-acoustic attenuation for frequencies in the range 2 to 20000 Hz, e.g. for frequencies between 50 Hz and 15000 Hz, e.g. for frequencies between 500 Hz and 2000 Hz.

Typical applications could be filtering of tonal components created by rotation machinery both for isolation walls or noise blocking earmuffs. Another example is reduction of noises in passenger cabines in airplanes, where lightweight application is important. Especially noise in propeller planes can be blocked. Still another example is a vehicle wherein noise transmission could be blocked from the engine to the passengers.

To obtain zones of strong vibro-acoustic attenuation, according to embodiments of the present invention at least one mechanical resonator is used. A resonator connected to a host structure possesses the possibility to localize, for a certain frequency zone, most of the movement of the device in the resonator, reducing the movement in the host structure, i.e. the remainder of the device.

According to embodiments of the present invention, the resonator has a vibration mode predominantly excitable by out of plane movement of the host structure.

According to embodiments of the present invention tuning of the vibration mode of the resonator may be performed by tuning the mass of the resonator, the stiffness of the connections, the geometry of the connections, the number of connections, the material type of the connections (flexible materials or not), the thickness of the resonator, the cross-sectional area of the connector legs, etc. Without wishing to be bound by theory, the, the resonators can be seen as a spring mass system where the massive part of the resonator, resonates on the stiffness of the connections to the host-structure. The out of plane vibrational property then is proportional to the mass of the massive part of the resonator structure, and inversely proportional to the stiffness of the connection. A plurality of tuning parameters can then be used for tuning the vibration mode so that it is predominantly excitable by out of plane movement of the host structure. Some examples are:

Increasing the mass of the massive part and thus adjusting the out of plane vibrational property can be performed by either increasing the thickness of that part of the resonator or using heavier materials for that part Decreasing the stiffness of the connection and thus adjusting the out of plane vibrational property can be performed by either making the connections of a flexible material or choosing a geometry for the cross section which has a low stiffness (decrease thickness).

Tuning of these parameters thereby advantageously is performed in such a manner that the thickness of the resonator is smaller than 80% of the cavity height, the cross-sectional area of the connector-legs is smaller than 25% of the cross-sectional area of the cavity where it is connected to, the amount of added mass being limited by the application the device is used for.

The materials used for the resonator may be any suitable type of materials, such as for example metals, polymers, materials suitable for 3D printing etc. Particular examples can be polystyrene, Acrylonitrile butadiene styrene (ABS), metals such as steel, titanium or aluminum, . . . The Young's modulus may for example be in the range 0.1 Mpa to 100000 Mpa. Densities may for example be in the range 500 to 5000 kg/m$^3$. For the connection legs, materials from the same categories as mentioned above can be used. Connections may be made in any suitable manner such as by 3D printing (where the structure is constructed in connection), through glueing of a layer comprising the connection legs and layers of the host structure, through glueing of the connection legs to the edges of the cavity, etc.

Tuning may be performed in an optimization process, e.g. by trial and error or taking into account guiding rules based on the above statements. In an alternative embodiment, optimization also can be performed using finite element modeling.

According to embodiments of the present invention, small resonators can be added internally to the host structure, e.g. into cavities of host structures with internal cavities. This addition on a small scale can change the macro behaviour of the device drastically in a region close to a resonance frequency of the local resonators. In this zone, most of the movement is trapped in the local resonators and since the at least one resonator is added internally, the surrounding material shows very little vibrations, resulting in good vibration and noise isolation, transmission and absorption.

Next to leading to good vibro-acoustic attenuation, the addition of local resonators into cavities may also result in three main advantages:

The addition of local resonators to a host structure, e.g. in existing cavities, improves the vibro-acoustic behaviour, while hardly affecting the mechanical stiffness of the original material.

For some embodiments, the devices can be used in contaminated environments since the resonators can be enclosed in the device and don't rely on interaction with the surrounding air; this is in strong contrast with acoustic resonators and acoustic materials.

There is a high degree of freedom for design of the resonator since the only constraint on the resonator is the possibility to connect it to the host structure. The frequency zones of attenuation are thus easily tuneable through the variation of the design parameters of the local resonators. As design parameter the materials used for the resonators, the shape of the resonators and the way of connecting the resonators to the structure can be used.

Since the resonance of a local resonator leads to suppression of the motion of the structure predominantly at that resonance frequency, multiple resonators with different resonance frequencies lead to multiple frequency zones with suppression.

To achieve this, multiple resonators with different resonance frequencies can be added in one cavity, different cavities can have difference resonators or the added resonators can have multiple resonance frequencies. The resonance frequencies of the resonators can be tuned by the materials, the shape, or the connection of the resonators.

Some basic principles of the design of an exemplary device will now be described as reference to the figures and at least one preferred embodiment, embodiments of the present invention not necessarily being limited by features described below.

Figure 2:
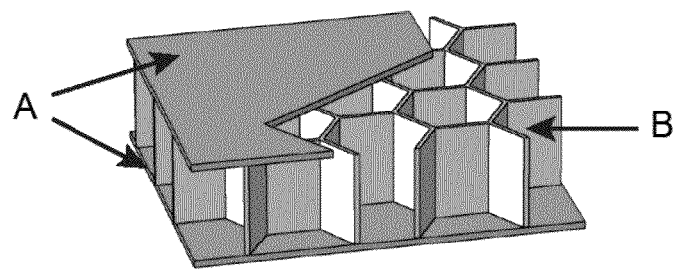
FIG. 2 shows an example of a periodic composite material with periodic cavities being a honeycomb structure, as can be used as a basis material for manufacturing a device according to an embodiment of the present invention.
Figure 3:
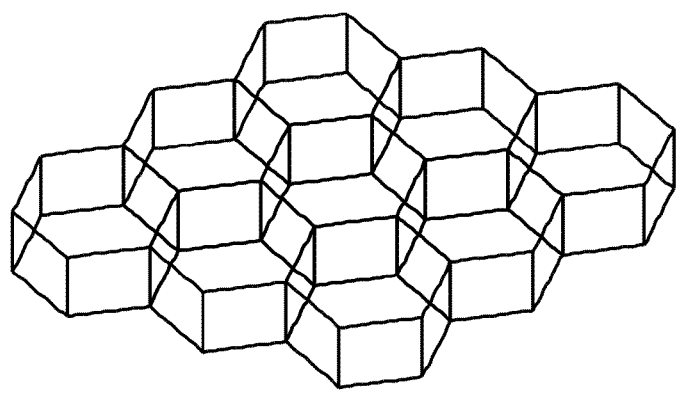
FIG. 3 shows an example of the core of a periodic composite material being a honeycomb structure, as can be used as a basis material for manufacturing a device according to an embodiment of the present invention.
Figure 4:
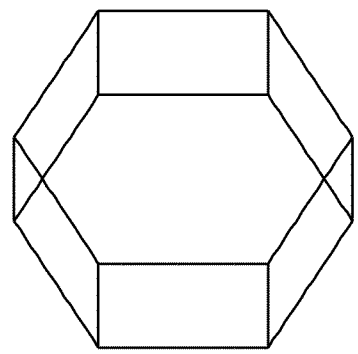
FIG. 4 illustrates the unit cell of the periodic composite material of FIG. 2.

FIG. 1 and FIG. 2 show devices made of composite material with internal cavities. Such structures can combine excellent mechanical properties with a low mass. In FIG. 1 and FIG. 2, the composite materials comprise a top and bottom layer (A) and a core material (B), which in general is not built from the same material, although the same material can be used. FIG. 3 depicts a two dimensional periodicity, but one or three dimensional periodicity is possible as well. The core can also be built from a combination of layers, where one or more layers can have cavities. FIG. 3 shows the core of periodic composite material. FIG. 4 shows a unit cell for the core of FIG. 3.

In the presented invention, in at least one or more cavities, local resonators are added.

Figure 5:
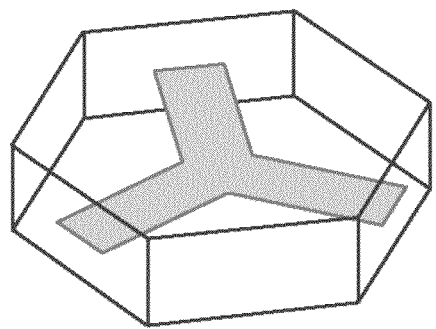
FIG. 5 illustrates the unit cell of a periodic composite material with addition of a local resonator, according to an embodiment of the present invention
Figure 6:
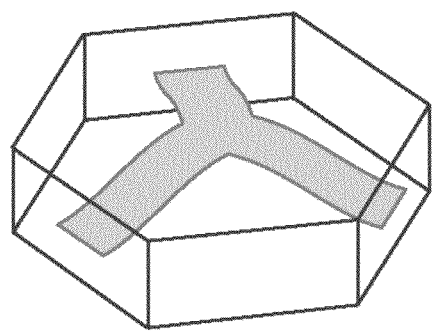
FIG. 6 illustrates a first bending mode of the local resonator of FIG. 5.

The local resonators should be connected in such a way to the structure, that the resonator is excited by the vibration mode that needs to be attenuated. In FIG. 5 a unit cell with added local resonator (gray) is shown. The local resonator is a homogenous structure with a three-legged form. Each leg of the resonator is connected to a side plane of the unit cell. In FIG. 5 the connection is in the middle of the side plane, although this is not a requirement. The first resonance mode of the local resonator is out-of-plane bending (FIG. 6), which will be excited by out-of-plane excitation of the panel. The resonator shape and connection points were chosen since this resonator is well excited by different wave kinds, although different shapes and connections can be chosen as well.

To decrease vibration and acoustic response, resonators with a predominantly out-of-plane mode shape such as bending modes can be used. To decrease energy transmission through plates from a source to an acoustically radiating surface, resonators with an predominantly in-plane resonance can be used.

For frequencies in the vicinity of the resonance of the local resonator, the movement of the structure will be concentrated in the local resonator, leading to a decrease in movement of the top and bottom planes of the structure. For frequencies higher than the resonance frequency, the local resonator will move out of phase with respect to the surrounding structure. In the frequency zone where the momentum of the resonator, is higher than the momentum of the surrounding material, free wave propagation is inhibited, leading to a zone without resonances for the macro-material.

In general three zones will be distinguishable in the frequency response of the resulting structure. For frequencies close to but lower than the resonance frequency the vibro-acoustic response will start decreasing. At the resonance frequency of the local resonator a minimum global response is obtained. In the zone after the resonance, as long as the momentum of the local resonator is higher than the momentum of the surrounding structure, a zone without resonance and thus low vibro-acoustic response is found. An example of this response will follow in the detailed description. Since the zone of attenuation is linked to the momentum of the system, non symmetric modes create larger zones of attenuation, since symmetric modes have a zero net momentum. Furthermore, resonators with a larger effective mass, lead to larger zones of attenuation. Also the amount of damping in the resonator has an effect on the amount of attenuation and the range of frequencies in which attenuation is achieved. More damping decreased the amount of attenuation but increases the range wherein attenuation is achieved. This can be done either by using a material with high material damping or by adding a damping layer to the material, by e.g. gluing a damping layer to a part of the resonator. This damping layer would be most effective in that part of the resonator that undergoes a lot of movement, such as the connector legs.

Acoustic radiation is caused by mode shapes which are the result of standing waves across the structure. These standing waves are linked to the wavelength of free propagation: a standing wave comprises at least half a wavelength. The addition of local resonators can be seen as an addition of small tuned vibrators which prevent the movement of the structure at certain points. One example of a condition wherein vibration at the outside of the device can be limited is when the distance between two resonators with approximately the same resonance frequency is smaller than half the wavelength of free wave propagation in the host structure, e.g. surrounding material, as the formation of standing modes on the outer surfaces will be hindered.

In one embodiment, the distance between two resonators acting in a certain frequency band therefore is selected to be smaller than half the wavelength of free wave propagation in the surrounding material at the frequency band of interest, resulting in good vibro-acoustic attenuation.

Figure 7:
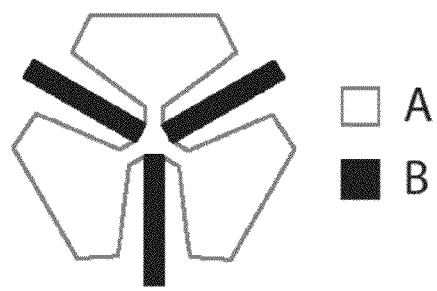
FIG. 7 shows a different type of local resonator as also can be used in a system according to an embodiment of the present invention. The resonator can be seen as made up of two parts: part A which acts as a mass, part B which acts as springs. Proper design (material, shape or thickness) of both parts leads to a wide spectrum of resonance frequencies, comparable to a theoretical mass-spring system.

With respect to design constraints for the resonators used, the only constraint on the resonator is the possibility to connect it to the surrounding structure allowing a huge freedom of design for the resonator: the frequency of the resonator can be tuned by the combination of design and material choice:

Homogenous resonators: FIG. 5 shows a local resonator made from one material that can differ from the core material. The shown structure has a 3-legged structure to assure good excitement by different modes from the surrounding material. FIG. 7 shows a local resonator based on the design of FIG. 6, the addition of extra material connected to the centre of the resonator, results in a lower first bending mode with respect to FIG. 6. The resonance frequency will be determined by the stiffness of the legs (B), and the mass of the centre (C).

Figure 8:
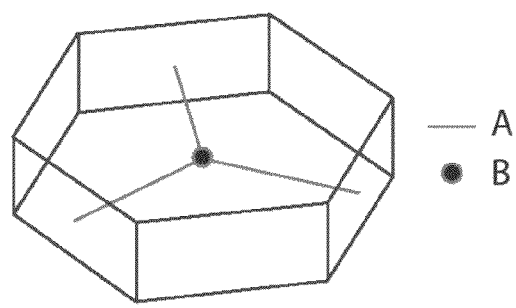
FIG. 8 shows a unit cell with local resonator, as can be used in a system according to an embodiment of the present invention. The local resonator consists of 3 flexible strings and a discrete mass.

Combination of materials. The local resonator can be made up of a combination of two materials. FIG. 8 shows a local resonator made up of flexible strings (A) and a localized mass (B)

Figure 9:
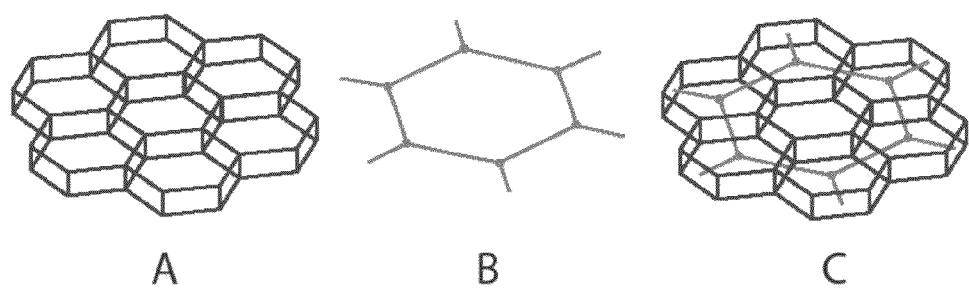
FIG. 9 illustrates the construction of a periodic material with local resonator by combining a hexagonal unit cell with a hexagonal resonator structure, illustrating an embodiment according to the present invention.
Figure 10:
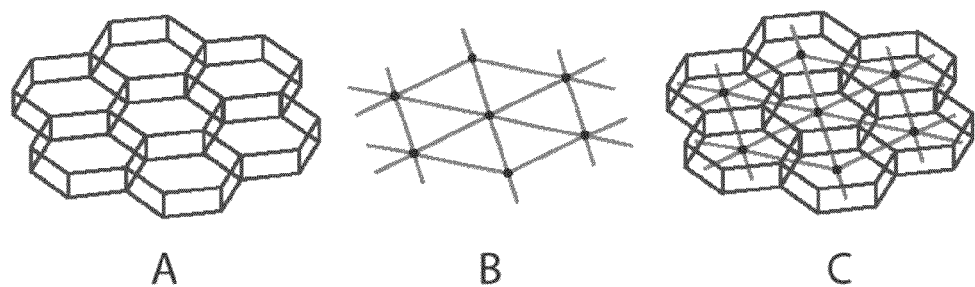
FIG. 10 shows a construction of a periodic material with local resonator by combining a hexagonal unit cell with a triangular resonator structure, illustrating an embodiment according to the present invention.

The combination of a three-legged resonator (FIG. 5 to FIG. 8) has an additional advantage from a production point of view, in combination with a hexagonal unit cell (e.g. FIG. 4). The composite material with local resonators (FIG. 9) can be built from a layer lay out combining two times a hexagonal core (A) with in between a local resonator layer in hexagonal form (B) to create the combined material (C). This can also be achieved with for example six-legged resonators (FIG. 10). More generally, mass, number of connection points, Young modulus of the connection, etc. Can be used as parameters for tuning the resonance frequency of the resonator.

This layered approached can in general be used for every kind of resonator by also including the geometry of the core in the resonator-layer.

A second method of producing composite panels with local resonators can be achieved as follows: closed cavities with local resonators can be produced in a first step. In a second step these resonators can be added in a later production phase to the material in either a periodic or random fashion. In this way a material with cavities and local resonators is produced. The latter is also illustrated with an example below.

By combining resonances, multiple zones of attenuation or larger zones of attenuation can be achieved.

Figure 11:
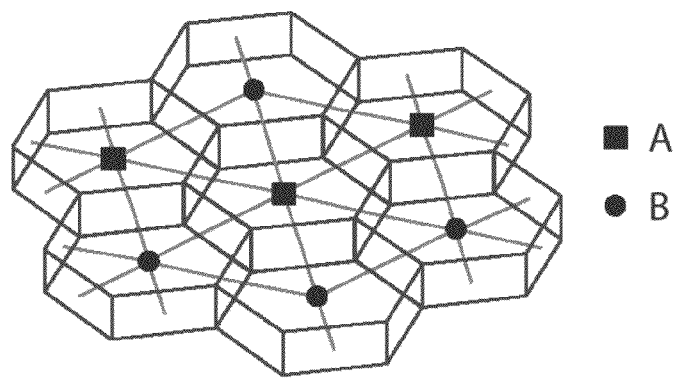
FIG. 11 shows a periodic material with different types of local resonators, illustrating an embodiment of the present invention.

The local resonator can be designed to have multiple resonance modes or multiple local resonators can be added in a cavity or local resonators with different resonance frequencies can be added in different cavities. FIG. 11 shows a hexagonal periodic structure where 6 legged string-mass resonators are used with different masses (A and B), leading to multiple attenuation zones.

Figure 12:
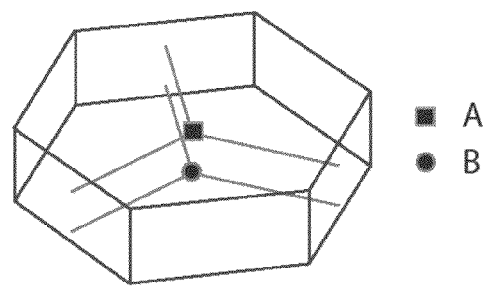
FIG. 12 shows a unit cell with multiple local resonators, each resonator having a different resonance frequency, according to an embodiment of the present invention.

FIG. 12 shows a unit cell in analogy with FIG. 8 where different resonators are added to one cavity. Two resonators with different mass are added (A and B) so the resonance frequencies of both resonators will be different.

Since the resonance of the local resonator, defines the frequency band of the zone of attenuation, active regulation of the resonance frequency of the local resonator, leads to an active controlled zone of attenuation. A possible configuration to achieve this is by using a membrane that splits cavities in two separate cavities as resonating structure. By regulating the pressure on one side of the cavity, the resonance of the local membrane becomes active regulated.

In another actively steered embodiment, the resonating structure and connector legs can be made as a hollow structure where the connection legs include internal channels connecting to the hole in the resonating structure. The host-structure can be made with internal channels which connect to the hollow connection legs. By regulating the air pressure of the air in the channels, and thus the resonator-structure, the stiffness of the resonating structure can be actively regulated. This in turn results in an actively steered resonance frequency and thus actively steered zones of attenuation.

In an alternative embodiment, the device also may comprise a host structure. In the material host structure, randomly or periodically, cells are added wherein a mechanical resonator is added. Such resonators can be connected through connection legs to the cell side, which is at its turn embedded and thus connected to the host material. Such cells can advantageously be made up front. One technique for manufacturing such cells may be through 3dimensional printing. The cells can then in a later step be distributed in the host material, when the device is manufactured.

Typical applications of such embodiments may be in lightweight materials and structural or sound isolation.

Another example of an embodiment, relates to a device wherein a multiple layer structure is used, wherein the multiple layers form or comprise cavities with mechanical resonators. Such devices provide again good isolation properties and can for example be used for creating sound blocking devices such as sound-blocking headphones. This would be good for, but not solely, blocking tonal frequencies. By way of illustration, embodiments of the present invention not being limited thereto, an example of a material is described in more detail below and simulation results indicate features and advantages of embodiments of the present invention. As an example a periodic composite material is taken: a honeycomb structure (FIG. 3) made up by the repetition of a homogenous hexagonal cell (FIG. 4) and covered with top and bottom plates.

As resonating structure, the structure depicted in FIG. 7 is chosen. This structure is connected to the unit cell in the middle of the unit cell, resulting in FIG. 13. The dimensions of the unit cell and resonator can be derived from FIG. 13 and Table 1.

TABLE 1

| | |
|---|---|
| L | 10 mm |
| H | 10 mm |
| a | 1/15 * L |
| b | 1/8 * L |
| c | 1/5 * L |
| d | 1/8 * L |
| e | 1/8 * L |

The entire unit cell (bottom plate, top plate, core and resonator) is made up of Polypropylene (Young's modulus: 1.1 GPa, Density=900 kg/m3, Poisson ratio=0.4).

The thickness of the core, the resonating structure and the top and bottom faces of the panel, is 1 mm.

Finite element modelling of the resonator indicates a first bending resonance mode around 1625 Hz for the case where the connection points of the resonator are clamped.

A Finite element model of a finite plate is built, comprising 18×14 unit cells and all cells include a local resonator. At the boundaries the top and bottom plate are clamped. Resulting in a rectangular composite plate of 303×205 mm. Modal analysis of the plate shows that no out-of-plane resonance modes of the composite panel are found in a frequency zone starting at 1542 up to 1675 Hz. In a region below this frequency zone, the movement of the plate is strongly localized in the local resonators.

The improvement in vibro-acoustic behaviour is proven by simulating an acoustic transmission measurement. In this simulation, a plate (303×205 mm) is clamped in a 2D acoustic baffle. Below the baffle an acoustic monopole radiates acoustic power. The acoustic power transmission above the baffle is monitored.

Different plates are compared:
   A honeycomb plate with local resonators as described above.
   A honeycomb plate without local resonators but with the same mass as the plate with resonators. This by increasing the density (from 900 to 1087 kg/m3) and maintaining the other parameters.
   A homogenous steel (Young's modulus: 210 GPa, Density=7800 kg/m3, Poisson coefficient=0.3) plate with a thickness of 0,477 mm to have the same total mass as the honeycomb plate with resonators.

For vibro-acoustic analysis, the structural model of the finite plate is coupled to the acoustic model of the monopole and acoustic baffle. An indirect boundary element method is used for the acoustic model. The structural model used mode shapes of the finite clamped plate with frequencies up to 4000 Hz and a modal damping of 0.1% for all modes.

Figure 14:
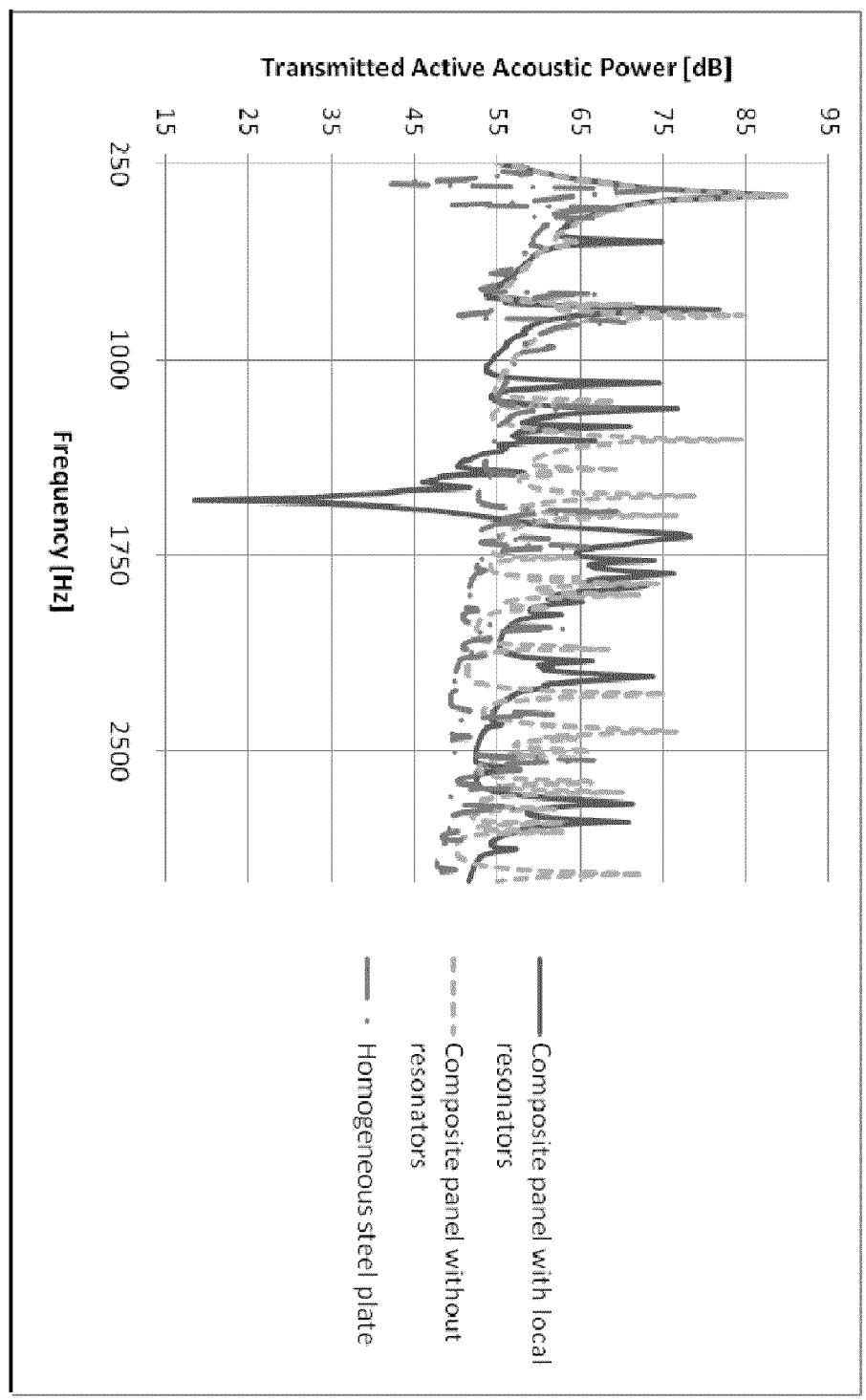
FIG. 14 shows simulation results for the acoustic radiation of a system according to an embodiment of the invention.

FIG. 14 shows the simulated results of the transmitted acoustic power to the region above the baffle. In the frequency zone 1260-1640 Hz resp. 1330-1630 Hz the composite panel with local resonators shows clearly an improvement of acoustic isolation with respect to the composite panel without resonators respectively the homogenous steel plate.

For frequencies below 1540 Hz, the movement is gradually more localized in the local resonators, leading to small plate displacements and thus lower radiated acoustic powers, with a minimum at 1542 Hz. Between 1542 Hz and 1675 Hz, no plate resonances can be observed.

It is clear that the addition of local resonators is a powerful tool to improve the vibro-acoustic behaviour in certain frequency bands linked to the resonance of the local resonators.

Figure 13:
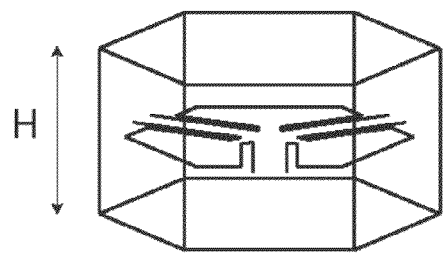
FIG. 13 illustrates a unit cell of the periodic structure used for simulating side view, top view and zoom of the top view of ⅛th of the unit cell, allowing illustration of advantages and features of embodiments of the present invention.
Figure 13:
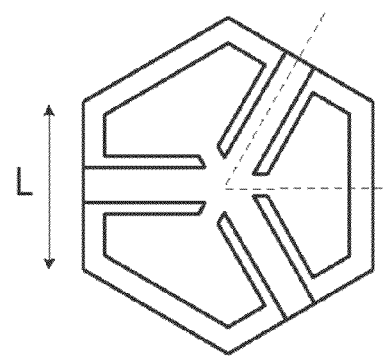
Figure 13:
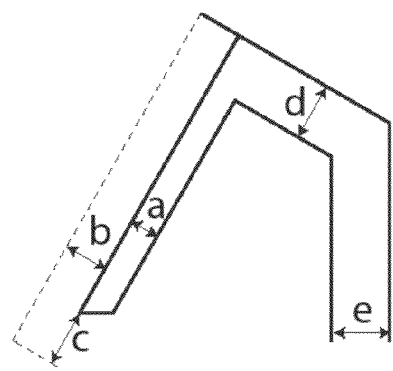
Figure 15:
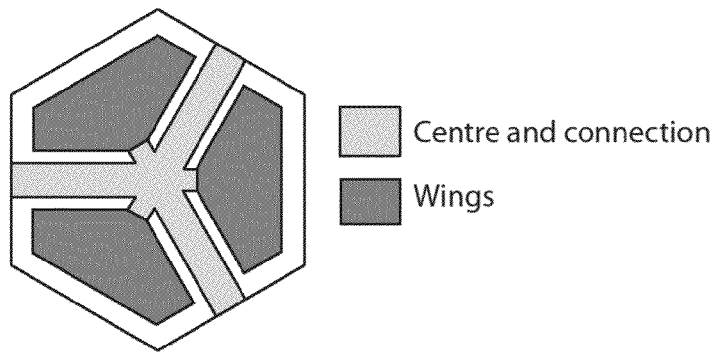
FIG. 15 illustrates a unit cell for a device according to an embodiment of the present invention used for an experimental test.

In another example a fabrication process and experimental data is given for a further particular embodiment. A resonating structure as in FIG. 13 is chosen with parameters as in Table 2. The resonating structure has a thickness of 4.5 mm for the centre and connection parts (light gray in FIG. 15) and 9 mm for the wings (dark gray in FIG. 15). The core has a thickness of 3 mm.

Figure 16:
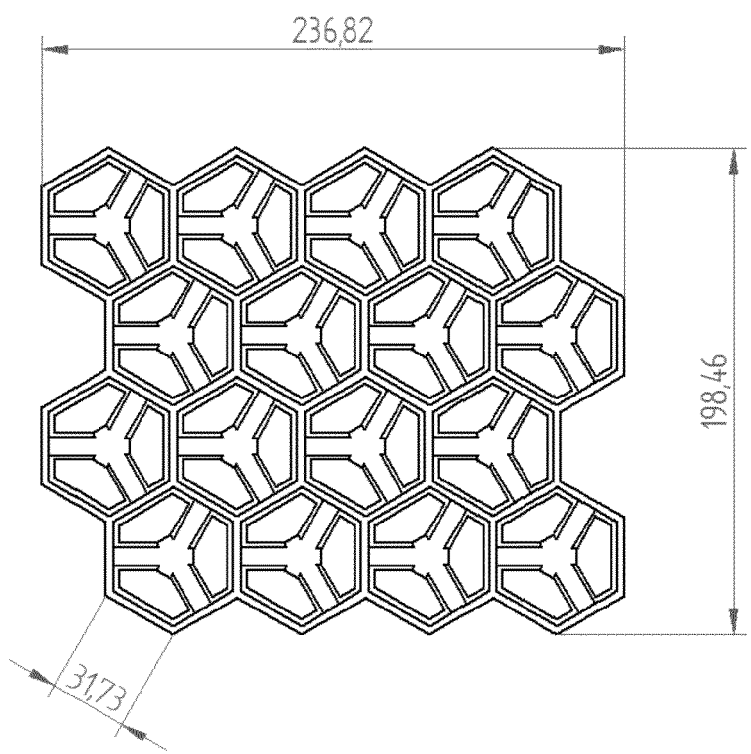
FIG. 16 shows a computer aided design of the test core with local resonators and the dimensions of the panel, illustrating features of an embodiment of the present invention.

A finite structure is made up as a repetition of 16 unit cells. FIG. 16 shows this structure, the shown distances are in millimeter. The structure can be seen as the core of a honeycomb structure with added local resonators. No top or bottom plates are added to the structure. The structure is produced by a 3D-printer and is made up of ABS-plus (Young's modulus: 1.8 GPa, Density=904 kg/m3, Poisson ratio=0.4).

Figure 17:
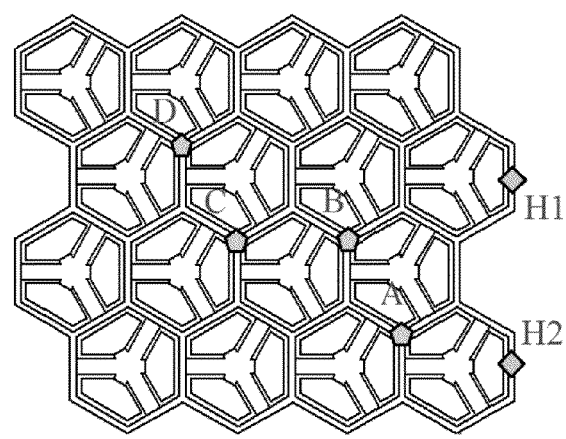
FIG. 17 shows a computer aided design of the test core with indication of the response points (pentagons) and the connection points for the suspension (diamond), illustrating features of an embodiment of the present invention.
Figure 18:
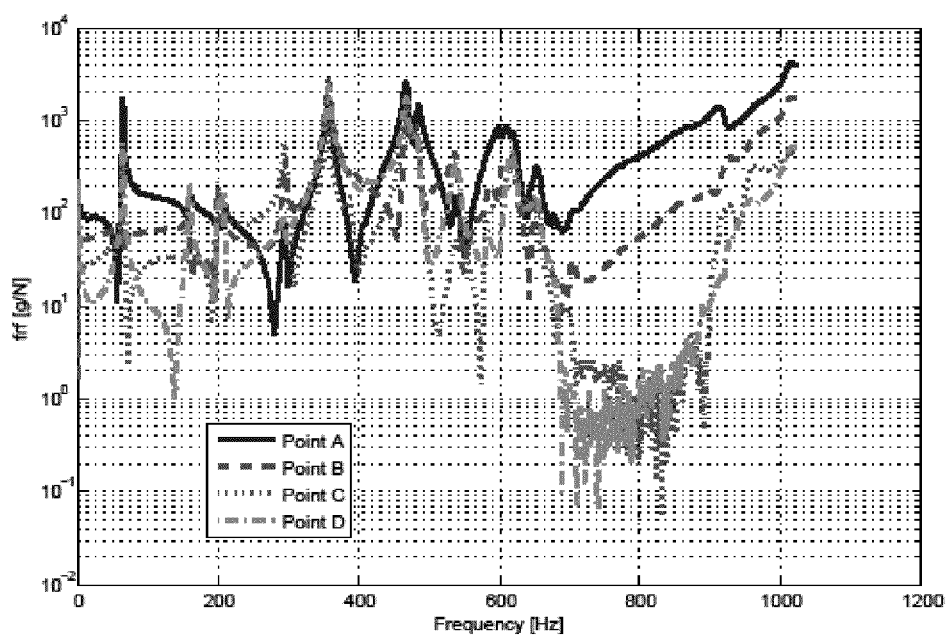
FIG. 18 illustrates experimentally measured accelerations for hammer excitation at point A of a test core for a device as shown in FIG. 13, indicating features of an embodiment of the present invention.

The structure is hinged from 2 locations with a wire so as to simulate a free panel (Points H1 and H2 on FIG. 17). The structure is excited by a hammer in point A (FIG. 17) and the out-of-plane accelerations on 4 points on the core are measured (points A to D). FIG. 18 shows the resulting measured frequency response curves. It is clear that a reduction in vibration behaviour is obtained in a frequency zone starting at 690 Hz and extending tot 830 Hz. This corresponds well with the first structural bending mode of the resonating structure (730 Hz).

The movement of the core structure in this frequency range is strongly localized. Since most of the energy goes to the movement of the resonating structure, the response of the core one cell away from the excitation points has already a reduced response of more than 10 dB while on 2 cells distance, the response is reduced 30 to 50 dB.

TABLE 2

| | |
|---|---|
| L | 30 mm |
| H | 15 mm |
| a | 1/15 * L |
| b | 1/8 * L |
| c | 1/5 * L |
| d | 2/15 * L |
| e | 2/15 * L |

The invention claimed is:

1. A device for vibro-acoustic attenuation and/or for reduced energy transmission, the device comprising:
    a host structure;
    at least one mechanical resonator connected to the host structure, the at least one mechanical resonator being connected to one or more sides of the host structure by one or more connection legs,
    wherein the host structure comprises a plurality of cavities separated by adjoining walls wherein the at least one mechanical resonator is connected therein and wherein the at least one connected resonator has a vibration mode predominantly excitable by out of plane movement of the host structure, wherein said out of plane movement is a movement of the host structure in a perpendicular or normal direction, relative to an unexcited position of the host structure.

2. A device according to claim 1, wherein said cavities are closed cavities.

3. A device according to claim 1, wherein more than one cavity comprises a mechanical resonator and/or wherein at least one cavity comprises more than one mechanical resonator.

4. A device according to claim 1, wherein the host structure comprise a core that is made up of rectangular, cylindrical, elliptical, circular or polygonal unit cells or a combination of these unit cells.

5. A device according to claim 1, wherein the host structure is periodic or non-periodic.

6. A device according to claim 1, wherein the host structure comprises a core that is a honeycomb structure.

7. A device according to claim 6, wherein the honeycomb structure comprises a unit cell having a plurality of side panels and wherein said mechanical resonator is connected to some or all of the side panels or wherein the honeycomb structure comprises a hexagonal unit cell and wherein the resonator comprises three legs connected to three different side panels of the unit cell or, wherein the honeycomb structure comprises a hexagonal unit cell and wherein the resonator comprises six legs connected to the different side panels of the unit cell.

8. A device according to claim 1, wherein the host structure is made of any of a composite material, a multilayered core material, a one layered core material, a combination of different kinds of core material or a homogeneous material or wherein the core of the host structure is covered by none, one or two covering layers made of the same material or two covering layers made of different materials.

9. A device according to claim 1, wherein the at least one mechanical resonator is made of homogeneous material, is made of a homogeneous material being the same material as the host material or a core thereof, or is made of multiple materials.

10. A device according claim 1, wherein the at least one mechanical resonator comprises multiple vibration modes with different frequencies which are predominantly excited by out-of-plane motion of the host structure.

11. A device according to claim 1, comprising a plurality of mechanical resonators, wherein at least some of the plurality of resonators have a vibration mode with approximately the same frequency or wherein at least some of the plurality of resonators have a different frequency for the vibration mode.

12. A device according to claim 11, wherein the distance between two resonators and the number of resonators is selected such that the distance is on average smaller than or in the order of magnitude of half the wavelength that corresponds to the spatial wave number comprised in the vibration pattern in the host structure without the at least one resonating structure in the frequency range wherein vibro-acoustic attenuation is desired.

13. A device according to claim 1, wherein the device is adapted for controlling semi-actively, actively or adaptively a resonance frequency of the at least one mechanical resonator.

14. A device according to claim 13, wherein the at least one mechanical resonator comprises at least one connection leg with an internal channel in which pressure can be regulated, for actively controlling a resonance frequency.

15. A device according to claim 1, wherein the plurality of cavities are stacked in three directions of the host structure.

16. A method of vibration and/or sound insulation, of sound absorption or of reduction of sound or energy transmission in at least one frequency range, the method comprising providing a device according to claim 1.

17. A method for manufacturing a device for vibro-acoustic attenuation and/or for reduced energy transmission, the method comprising:
    providing a host structure;
    connecting at least one mechanical resonator having a vibration mode predominantly excitable by out of plane movement of the host structure to the host structure, wherein said out of plane movement is a movement of the host structure in a perpendicular or normal direction, relative to an unexcited position of the host structure, and wherein said connecting comprises providing one or more connection legs connecting the at least one mechanical resonator to one or more sides of the host structure with the host structure and wherein the host structure comprises a plurality of cavities separated by adjoining walls wherein the at least one mechanical resonator is connected therein.

18. A method according to claim 17 wherein said providing and connecting comprises connecting resonators to closed cavities and thereafter adding said closed cavities to said host structure in a random or periodic manner or, wherein the method comprises making a layer of material comprising the mechanical resonators and connecting the layer between two layers of core material in such a manner that cavities comprising resonators result.

19. A method according to claim 18, wherein the one layer of material comprising the mechanical resonators comprises mechanical resonators interconnected by interconnection structures and wherein the two layers of core material are honeycomb cores.

20. A method according to claim 16, wherein the method comprises tuning a material of at least part of the at least one resonator for increasing the damping in the resonator or wherein the method comprises adding a damping layer to at least part of the at least one resonator for increasing the amount of damping in the resonator.

\* \* \* \* \*